(12) United States Patent
Bonig et al.

(10) Patent No.: US 12,112,378 B2
(45) Date of Patent: *Oct. 8, 2024

(54) PRE-MATCHING ORDERS AT WIRE RATE IN A CENTRAL LIMIT ORDER BOOK

(71) Applicant: Chicago Mercantile Exchange Inc., Chicago, IL (US)

(72) Inventors: Zachary Bonig, Skokie, IL (US); Brian Alvin Bourn, Chicago, IL (US); Suchith Vasudevan, Chicago, IL (US); David Lariviere, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,666

(22) Filed: Sep. 13, 2023

(65) Prior Publication Data

US 2024/0005400 A1    Jan. 4, 2024

Related U.S. Application Data

(63) Continuation of application No. 17/542,033, filed on Dec. 3, 2021, now Pat. No. 11,810,192, which is a continuation of application No. 16/013,662, filed on Jun. 20, 2018, now Pat. No. 11,216,875.

(51) Int. Cl.
*G06Q 40/04* (2012.01)
*G06Q 40/06* (2012.01)

(52) U.S. Cl.
CPC ............. *G06Q 40/04* (2013.01); *G06Q 40/06* (2013.01)

(58) Field of Classification Search
None
See application file for complete search history.

(56) References Cited

U.S. PATENT DOCUMENTS

| | | | |
|---|---|---|---|
| 2005/0096999 A1 | 5/2005 | Newell | |
| 2006/0184447 A1 | 8/2006 | Nieboer et al. | |
| 2007/0118459 A1 | 5/2007 | Bauerschmidt | |
| 2011/0167221 A1 | 7/2011 | Pangal | |
| 2015/0262297 A1* | 9/2015 | Callaway | G06Q 40/04 705/37 |
| 2016/0364799 A1 | 12/2016 | O'callahan | |
| 2017/0103461 A1 | 4/2017 | Acuña-rohter | |
| 2017/0193602 A1 | 7/2017 | Studnitzer | |

OTHER PUBLICATIONS

Extended European Search Report, from EP Application No. EP 19181012, Oct. 23, 2019, EP.

* cited by examiner

*Primary Examiner* — Matthew S Gart
*Assistant Examiner* — Amit Patel
(74) *Attorney, Agent, or Firm* — Lempia Summerfield Katz LLC

(57) ABSTRACT

Systems and methods are provided to increase the rate at which a system can accept and process data transaction request messages. The system includes a pre-processor that filters incoming data transaction request messages prior to transmitting the messages for further processing, for example, by a matching engine. The pre-processor quickly identifies whether a new arriving data transaction request is transactable. If the new arriving data transaction request is not transactable, then the data transaction request will be transmitted and stored in a main data structure and not transmitted to the matching engine.

20 Claims, 5 Drawing Sheets

PRE-MATCHING ORDERS AT WIRE RATE IN A CENTRAL LIMIT ORDER BOOK

REFERENCE TO RELATED APPLICATIONS

This application claims priority to and the benefit as a continuation under 37 C.F.R. 1.53(b) of U.S. patent application Ser. No. 17/542,033, filed Dec. 3, 2021, now U.S. Pat. No. 11,810,192, which is a continuation under 37 C.F.R. 1.53(b) of U.S. patent application Ser. No. Ser. No. 16/013, 662, filed Jun. 20, 2018, now U.S. Pat. No. 11,216,875, the entirety of all of which are incorporated by reference herein and relied upon.

BACKGROUND

Computer processing speeds depend in large part on the amount of data being processed and the complexity of the operations and processing being performed on the data. Reducing or minimizing the number of data sets and/or operations performed thereon can increase processing efficiency. One exemplary environment where optimizing computer processing is desirable is in financial markets, and in particular, electronic financial exchanges, such as a futures exchange, such as the Chicago Mercantile Exchange Inc. (CME).

A financial instrument trading system, such as a futures exchange, referred to herein also as an "Exchange", such as the Chicago Mercantile Exchange Inc. (CME), provides a contract market where financial products/instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time, referred to as the expiration date or expiration month. An option is the right, but not the obligation, to sell or buy the underlying instrument (in this case, a futures contract) at a specified price within a specified time. The commodity to be delivered in fulfillment of the contract, or alternatively, the commodity, or other instrument/asset, for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract price.

As the number of orders and trades processed by an exchange computing system increases, electronic data transaction request messages used to submit orders and trades and transmitted to the exchange computing system can strain computer systems and networks that are used to transmit such messages. Moreover, the exchange computing system may include complex matching engines that process the electronic data transaction request messages. The matching engines may also be strained or overloaded by increases in the volume of electronic data transaction request messages. Accordingly, the resulting problem is a problem arising in computer systems due to the high volume, e.g., millions of electronic data transaction requests a day, received from multiple different submitters via different communications channels and processed by an exchange computing system.

DETAILED DESCRIPTION

Figure 1:
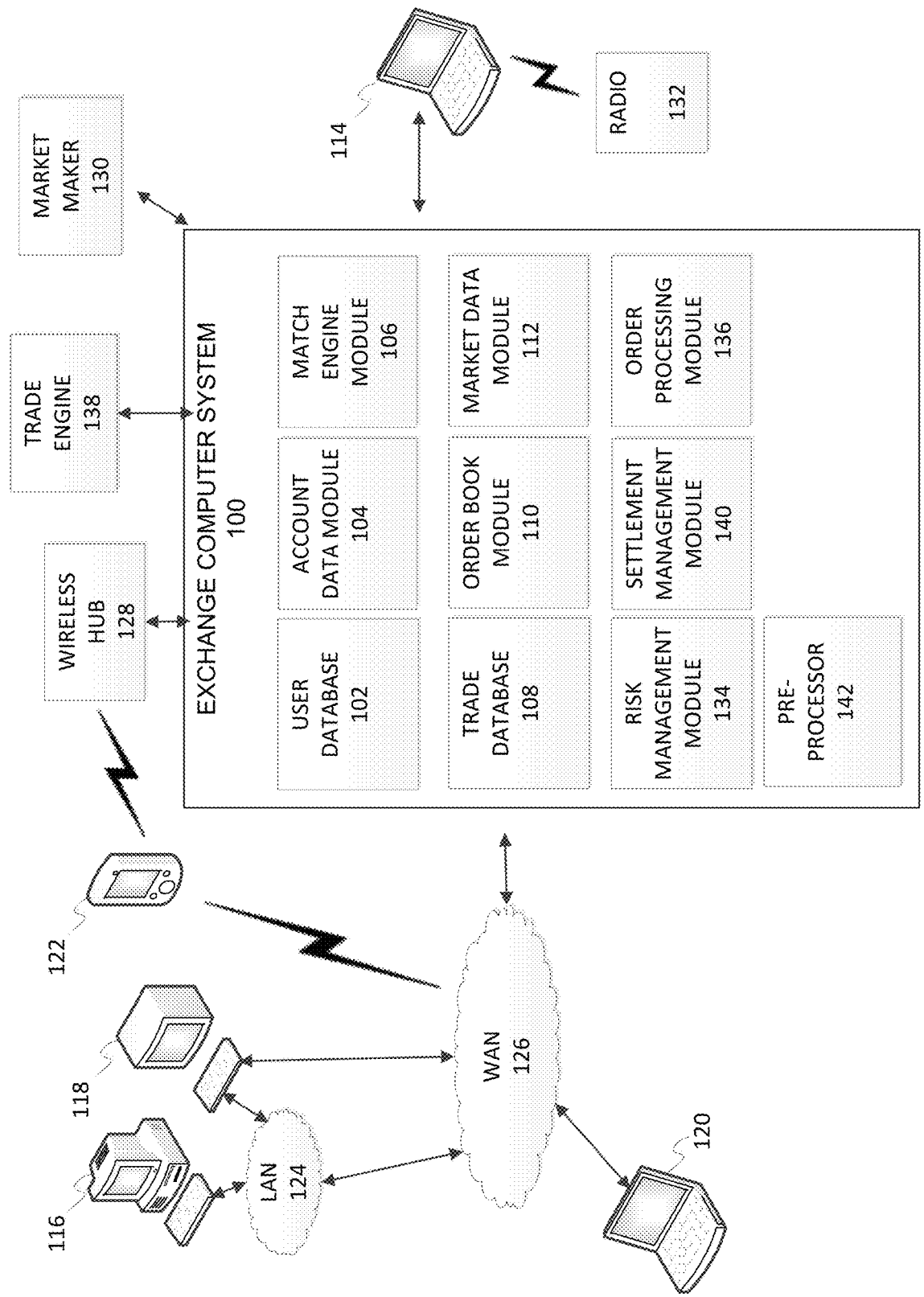
FIG. 1 depicts an illustrative computer network system that may be used to implement aspects of the disclosed embodiments.

The disclosed embodiments relate generally to a data communications system, for use by a data transaction processing network that increases or otherwise maximizes the rate at which the system can accept and process data transaction request messages. The system includes a pre-processor that filters incoming data transaction request messages prior to transmitting the messages for further processing, for example, by a matching engine. The pre-processor quickly identifies whether a new arriving data transaction request is transactable (e.g., matches at least partially with a suitable previously stored data transaction request, i.e., a previously received but at least partially unsatisfied transaction request that is at least partially counter to the incoming request). If the new arriving data transaction request is not transactable, then the data transaction request will be transmitted and stored in a main data structure and not transmitted to the matching engine, thereby avoiding burdening the matching engine with a transaction that will not be able to process, e.g., match. The pre-processor will continue to pre-process transactions. If an incoming data transaction request will possibly transact, then the data transaction request is flagged and transmitted to the matching engine where the incoming data transaction request is transacted thereby at least partially with a suitable previously received data transaction request stored in the main data structure, and the main data structure is adjusted. To process data transaction requests quicker, the pre-processor may be configured to minimize required system resources such that it may be implemented on an FPGA or a chip.

Improvements in networking technologies allow for the submission of data transaction request messages at a rate measured in single digit microseconds. Therefore, participants can submit data transaction request messages to a data communications system at the maximum possible wire rate allowed by the underlying networking hardware. Modern data transaction processing systems, such as electronic trading systems, process thousands, hundreds of thousands, or even millions of messages or transaction requests per day. Processing each message or transaction request can create a bottleneck, creating latency and adversely affecting processing speeds. If a system cannot accept and process transactions at the equivalent rate, then the system may become overwhelmed by traffic. Current systems rely on queuing and "pauses" in the market to handle excessive messaging volumes. Other current systems throttle incoming message rates or allow the market to slow during high-volume conditions.

At least some of the problems solved by the disclosed system are specifically rooted in technology, e.g., electronic data transaction request messages that are transmitted to a data transaction processing system are each processed by modules incurring a per-transaction request overhead, and are solved by means of a technical solution e.g. pre-filtering to readily identify non-transactable transactions using an efficient high-speed pre-processor and bypassing such transactions around unnecessary high latency processing components/stages or otherwise pipelining the processing of such transactions where atomic/serialized processing is unnecessary, thus improving processing response times and the overall performance of the exchange computing system.

In an embodiment, processing response time and overall performance are improved by pre-filtering data transaction request messages prior to being forwarded to a matching engine where received transactions may be matched against resting transactions. Checking for a match is computationally expensive in time and resources. Matching, which is a function typically performed by an exchange, is a process, for a given order that specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

The Exchange Computer System, as will be described below, monitors incoming orders received thereby and attempts to identify, i.e., match or allocate one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

Upon identification (matching) of a contra order(s), a minimum of the quantities associated with the identified order and the incoming order is matched and that quantity of each of the identified and incoming orders become two halves of a matched trade that is sent to a clearinghouse. The Exchange Computer System considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

As noted above, matching may be both computationally expensive in time and resources. In an example, a data transaction request message may match against multiple resting data transaction request messages, a process that may be computationally complex. In an embodiment, the pre-processor checks incoming data transaction request messages against a value to determine if the data transaction request messages are "transactable". Data transaction request messages that are determined to be not transactable are exempted from being forwarded to the matching engine, thus saving time and computational resources. In addition, prior to being matched or booked on a central limit order book, an incoming data transaction request messages may pass through multiple checks for market integrity. The checks may include Price Limits/Price Banding, Velocity Logic, Stop Price Logic, and Self Match Prevention among others. The process is sequential (non-pipelined) for every data transaction request message, and a new data transaction request message can begin to be processed only when a current data transaction request message has completed the entire processing pipeline. Data transaction request messages that are not going to match and are only booked may go through the whole process, further slowing down the system and limiting throughput. Most incoming data transaction request messages (e.g., <50% in most markets) are only booked (i.e., they rest) and are not matched.

An embodiment of the data transaction processing system minimizes the amount of processing, e.g., by the pre-filtering of the electronic data multiple transaction request messages, thus reducing the computing load of a matching engine of the data transaction processing system. The disclosed embodiments also improve throughput of a system by allowing pipelining of data transaction request messages. The disclosed embodiments also improve upon the technical field of networking by reducing the number of different messages transmitted to certain modules. The disclosed system is a specific implementation and practical application of an optimization processor that determines when to bypass certain processing heavy, time consuming software modules.

When the exchange computing system can avoid routing a message to an order book, e.g., perform filtering, the processing capacity, speed, and throughput of the exchange computing system may be increased, i.e., the processing capacity of the exchange computing system to process new transactions, while maintaining/ensuring transaction integrity, is maximized. The exchange computing system is accordingly improved and faster while still implementing the transaction processing logic when necessary and avoiding the additional processing burden when not necessary. The solutions disclosed herein are, in one embodiment, implemented as automatic responses and actions by an exchange computing system computer.

The disclosed embodiments may be directed to an exchange computing system that includes multiple matching processors that match, or attempt to match, electronic data transaction requests with other electronic data transaction requests counter (or contra) thereto. Incoming electronic data transaction request messages (each one including one electronic data transaction request) or electronic data multiple transaction request messages (each one including multiple electronic data transaction requests) may be received from different client computers over a data communication network, and output electronic data transaction result messages may be transmitted to the client computers and may be indicative of results of the attempts to match incoming electronic data transaction requests.

The disclosed embodiments may be implemented in a data transaction processing system that processes data items or objects. Objects may be implemented in code, using, among other things, a tangible computer-readable medium comprising computer-executable instructions (e.g., executable software code). Alternatively, objects may be implemented as software code, firmware code, specifically configured hardware, or processors, and/or a combination of the aforementioned. An object may be implemented and stored as a set of related data, e.g., a database. Objects may be implemented using a pre-defined data structure. An object may be implemented as an instance of a class that contains data and methods for processing the data. For example, an object may be a self-contained entity that includes data and procedures to manipulate the data. An object may be any item in the computing environment that can be individually manipulated, selected, or processed. Objects may be exposed as shapes, pictures, or words in a display screen or in a user interface.

Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items or objects.

The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing, and report this information to data recipient computing systems via outbound messages published via one or more data feeds One exemplary environment where optimizing computer processing of solutions is desirable is in financial markets, and in particular, electronic financial exchanges, such as a futures exchange, such as the Chicago Mercantile Exchange Inc. (CME). In particular, an exchange may offer multiple products and contracts for purchase that may be represented as objects in the computing system. The associated costs and values of objects may be considered to be related data sets. An exchange computer system may also be constrained by the tradable positions of markets, such as for example, bid and ask values for the different contracts, available on the exchange.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts, and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting, and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

The clearing house of an exchange clears, settles, and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as the debt obligations occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant may have a ripple effect on the solvency of the other participants. Conversely, CME's mark-to-the-market system does not allow losses to accumulate over time or allow a market participant the opportunity to defer losses associated with market positions.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access, and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions may occur in a consistent and predictable manner and without unknown or unascertainable risks. In addition, it should be appreciated that electronic trading systems further impose additional expectations and demands by market participants as to transaction processing speed, latency, capacity, and response time, while creating additional complexities relating thereto. The disclosed embodiments may further include functionality to ensure that the expectations of market participants are met, e.g., that transactional integrity and predictable system responses are maintained.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the Exchange may further define the matching algorithm, or rules, by which incoming orders will be matched/allocated to resting orders.

Some products on an exchange are traded in an open outcry environment where the exchange provides a location for buyers and sellers to meet and negotiate a price for a quantity of a product. Other products are traded on an electronic trading platform (e.g., an electronic exchange), also referred to herein as a trading platform, electronic trading system, trading host or Exchange Computer System, where market participants, e.g., traders, use software to send orders to the trading platform. The order identifies the product, the quantity of the product the trader wishes to trade, a price at which the trader wishes to trade the product, and a direction of the order (i.e., whether the order is a bid, i.e., an offer to buy, or an ask, i.e. an offer to sell). It will be appreciated that there may be other order types or messages that traders can send including requests to modify or cancel a previously submitted order.

In particular, electronic trading of financial instruments, such as futures contracts, may be conducted by market participants sending orders, such as to buy or sell one or more futures contracts, in electronic form to the Exchange. These electronically submitted orders to buy, and sell are then matched, if possible, by the Exchange, i.e., by the Exchange's matching engine, to execute a trade. Outstanding (unmatched, wholly unsatisfied/unfilled, or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book/data structure may be typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product. A Central Limit Order Book ("CLOB") may be a type of transparent order book system that matches customer orders.

In the exemplary embodiments, all transactions for a particular market may be ultimately received at the electronic trading system via one or more points of entry, e.g. one or more communications interfaces, at which the disclosed embodiments apply determinism, which as described may be at the point where matching occurs, e.g. at each matching engine where there may be multiple matching engines, each for a given product/market, or moved away from the point where matching occurs and closer to the point where the electronic trading system first becomes "aware" of the incoming transaction, such as the point where transaction messages, e.g. orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. See U.S. patent application Ser. No. 14/074,675, filed on Nov. 7, 2013, published as U.S. Patent Application Publication No. 2015/0127516, entitled "TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE", incorporated by reference herein.

Upon receipt of an incoming order to trade in a particular financial instrument, whether for a single component financial instrument, e.g. a single futures contract, or for multiple component financial instruments, e.g. a combination contract such as a spread contract, a matching engine, as will be described in detail below, may attempt to identify a previously received but unsatisfied order counter thereto, i.e. for the opposite transaction (buy or sell) in the same financial instrument at the same or better price (but not necessarily for the same quantity unless, for example, either order specifies a condition that it must be entirely filled or not at all). Previously received but unsatisfied orders, i.e., orders which either did not match with a counter order when they were received, or their quantity was only partially satisfied, referred to as a partial fill, are maintained by the electronic trading system in an order book database/data structure to await the subsequent arrival of matching orders or the occurrence of other conditions which may cause the order to be removed from the order book.

If the matching engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the matching engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The matching engine then generates match event data reflecting the result of this matching process. Other components of the electronic trading system, as will be described, then generate the respective order acknowledgment and market data messages and transmit those messages to the market participants.

As was described above, the financial instruments which are the subject of the orders to trade, may include one or more component financial instruments. While each financial instrument may have its own order book, i.e., market, in which it may be traded, in certain embodiments, each financial instrument, may be listed in alternative related order books. Accordingly, when an order for a financial instrument is received, it may be matched against a suitable counter order in its own order book or, possibly, against other suitable counter orders in the related order books. This is referred to as "implication" where a given order for a financial instrument may be matched via a combination of suitable counter orders for financial instruments which share common, or otherwise interdependent, financial variables.

The order for a particular financial instrument actually received from a market participant, whether it comprises one or more component financial instruments, is referred to as a "real" or "outright" order, or simply as an outright. The one or more orders which must be synthesized into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implied matching", the identified orders being referred to as an "implied match." There may be numerous different implied matches identified which would allow the incoming order to be at least partially matched and mechanisms may be provided to arbitrate among them, such as by picking the implied match comprising the least number of synthesized orders.

Upon receipt of an incoming order, or thereafter, the identification or derivation of a combination of one or more suitable counter orders which have not actually been received but if they were received, would allow at least a partial trade of the incoming order to be executed, is referred to as an "implied opportunity." As with implied matches, there may be numerous implied opportunities identified for a given incoming order. Implied opportunities are advertised to the market participants, such as via suitable synthetic orders, e.g., counter to the desired order, being placed on the respective order books to rest (or give the appearance that there is an order resting) and presented via the market data feed to appear available to trade in order to solicit the desired orders from the market participants. There may be numerous implied opportunities, the submission thereof, would allow the incoming order to be at least partially matched.

As was discussed above, electronic trading systems ideally attempt to offer an efficient, fair, and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

Although described below in connection with examples involving instruments having multiple components, such as calendar and butterfly spread instruments, the methods described herein are well suited for determining final values for any variety of objects conforming to a set of rules or relationships.

Generally, the disclosed embodiments may enable avoiding checking for matches by the matching engine on every received transaction. For the great majority of orders, an order will only be booked, not matched. In the disclosed embodiments, attempts to match only occur when an incoming order will potentially transact. Embodiments first perform a quick and efficient check for a match on every incoming order, thereby enabling the match engine to skip the operations for orders that have been flagged to rest and not aggress. Since matching is much more expensive, computationally, than booking, the exchange can operate at an order or magnitude faster.

The disclosed embodiments may be applicable to contracts for any type of underlier, commodity, equity, option, or futures trading system or market now available or later developed. The disclosed embodiments are also not limited to intra-market spread instruments, and accordingly may also be used in connection with inter-market spread instruments for contracts associated with different commodities.

While the disclosed embodiments may be described in reference to the CME, it should be appreciated that these embodiments are applicable to any exchange. Such other exchanges may include a clearing house that, like the CME clearing house, clears, settles, and guarantees all matched transactions in contracts of the exchange occurring through its facilities. In addition, such clearing houses establish and monitor financial requirements for clearing members and convey certain clearing privileges in conjunction with the relevant exchange markets.

The methods and systems described herein may be integrated or otherwise combined with other various risk management methods and systems, such as the risk management methods and systems described in U.S. Pat. No. 7,769,667 entitled "System and Method for Activity Based Margining" (the '667 patent"), the entire disclosure of which is incorporated by reference herein and relied upon. For example, the methods and systems described herein may be configured as a component or module of the risk management systems described in the above-referenced patent. Alternatively, or additionally, the disclosed methods may generate data to be provided to the systems described in the above-referenced patent.

In one embodiment, the disclosed methods and systems are integrated or otherwise combined with the risk management system implemented by CME called Standard Portfolio Analysis of Risk™ (SPAN®). The SPAN system bases performance bond requirements on the overall risk of the portfolios using parameters as determined by CME's Board of Directors, and thus represents a significant improvement over other performance bond systems, most notably those that are "strategy-based" or "delta-based." Further details regarding SPAN are set forth in the '667 patent.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

It should be appreciated that the disclosed embodiments may use other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX Binary, FIX/FAST, or by an exchange-provided API.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop, or other computers, such as the example computer 200 described below with respect to FIG. 2. A user database 102 may be provided which includes information identifying traders and other users of exchange computer system 100, such as account numbers or identifiers, user names and passwords. An account data module 104 may be provided which may process account information that may be used during trades. A matching engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market. A market data module 112 may be included to collect market data and prepare the data for transmission to users. A risk management module 134 may be included to compute and determine a user's risk utilization in relation to the user's defined risk thresholds.

The order book module 110 may be included to store outstanding (unmatched, wholly unsatisfied/unfilled, or partially satisfied/filled) orders. The order book module 110 may include one or more data structures or databases referred to as "order books." The outstanding orders may be referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product. A CLOB is an order book made up of limit orders what is processed continuously as time moves forward. When the order book is updated either by a match occurring or an order being rested, the update may be transmitted to the pre-processor 142.

The pre-processor 142 may be included to filter orders at wire rate. The pre-processor 142 may identify and flag received orders that are potentially going to match with a previously received order stored in the order book module 110. Orders that are predicted to at least partially match are flagged for further processing by a matching engine. Orders that are not predicted to match are not forwarded to the matching engine, but rather routed for storing on the order book to await a future order.

An order processing module 136 may be included to decompose delta-based, spread instrument, bulk, and other types of composite orders for processing by the order book module 110 and/or the matching engine module 106. The order processing module 136 may also be used to implement one or more procedures related to clearing an order.

A settlement module 140 (or settlement processor or other payment processor) may be included to provide one or more functions related to settling or otherwise administering transactions cleared by the exchange. Settlement module 140 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 140 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 140 may be used to determine a mark to market amount on a daily basis during the term of the financial instrument. Such determinations may also be made on a settlement date for the financial instrument for the purposes of final settlement.

In some embodiments, the settlement module 140 may be integrated to any desired extent with one or more of the other modules or processors of the exchange computer system 100. For example, the settlement module 140 and the risk management module 134 may be integrated to any desired extent. In some cases, one or more margining procedures or other aspects of the margining mechanism(s) may be implemented by the settlement module 140.

In some embodiments, the modules may be co-located or located in a geographically similar region. In other embodiments, modules of the exchange 100 may be in different regions. In an example, geographically distributed simultaneously running matching engine modules 106 may be operated as part of the exchange 100. Each matching engine module 106 may forward orders to each other during real time trading. Each matching engine module 106 may operate on its own or may share information with the other order matching engines depending on the market and any regulations. In certain embodiments, a matching engine module 106 for an exchange 100 may be legally obligated to route orders from the exchange 100 to a competitor's exchange.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware, or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described above, the disclosed embodiments may be implemented as a centrally accessible system or as a distributed system, e.g., where some of the disclosed functions are performed by the computer systems of the market participants.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user may interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via Wi-Fi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user. In another example, the exemplary computer device 118 may include a non-transitory computer-readable medium that stores instructions for modeling participant activity.

Numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Figure 2:
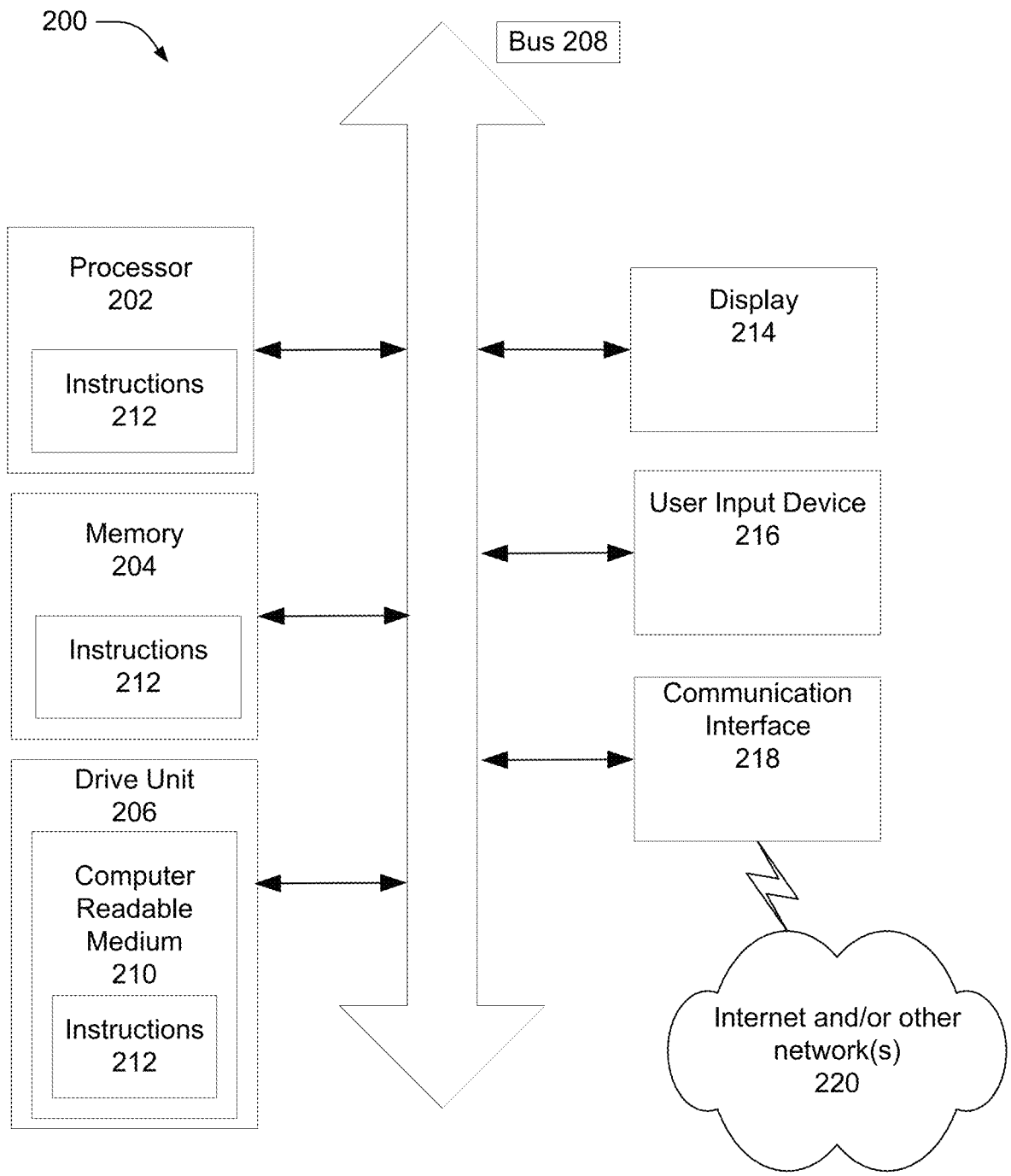
FIG. 2 depicts an illustrative embodiment of a general computer system for use with the disclosed embodiments.

Referring to FIG. 2, an illustrative embodiment of a general computer system 200 is shown. The computer system 200 may include a set of instructions that may be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a matching engine, margin processing, risk analysis, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 may be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that may communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode, and the like, operating alone or in combination. Likewise, processing strategies may include multiprocessing, multitasking, parallel processing, and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control, or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, may be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 may communicate voice, video, audio, images, or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. The computer readable medium may be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g., via computer executable software code, but whose form, e.g., the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification may be implemented on a device having a display, e.g., a cathode ray tube ("CRT") or liquid crystal display ("CRT") monitor, for displaying information to the user and a keyboard and a pointing device, e.g., a mouse or a trackball, by which the user may provide input to the computer. Other kinds of devices may be used to provide for interaction with a user as well. Feedback provided to the user may be any form of sensory feedback, e.g., visual feedback, auditory feedback, or tactile feedback. Input from the user may be received in any form, including acoustic, speech, or tactile input.

Embodiments of the subject matter described in this specification may be implemented in a computing system that includes a back end component, e.g., a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other. A system may depend on certain rules, logic, and inter-related objects and data. In technical and computing environments, a system may calculate values for multiple objects subject to rules, e.g., business or environment logic, associated with the objects. Certain object types may also depend on other object types.

Figure 3:
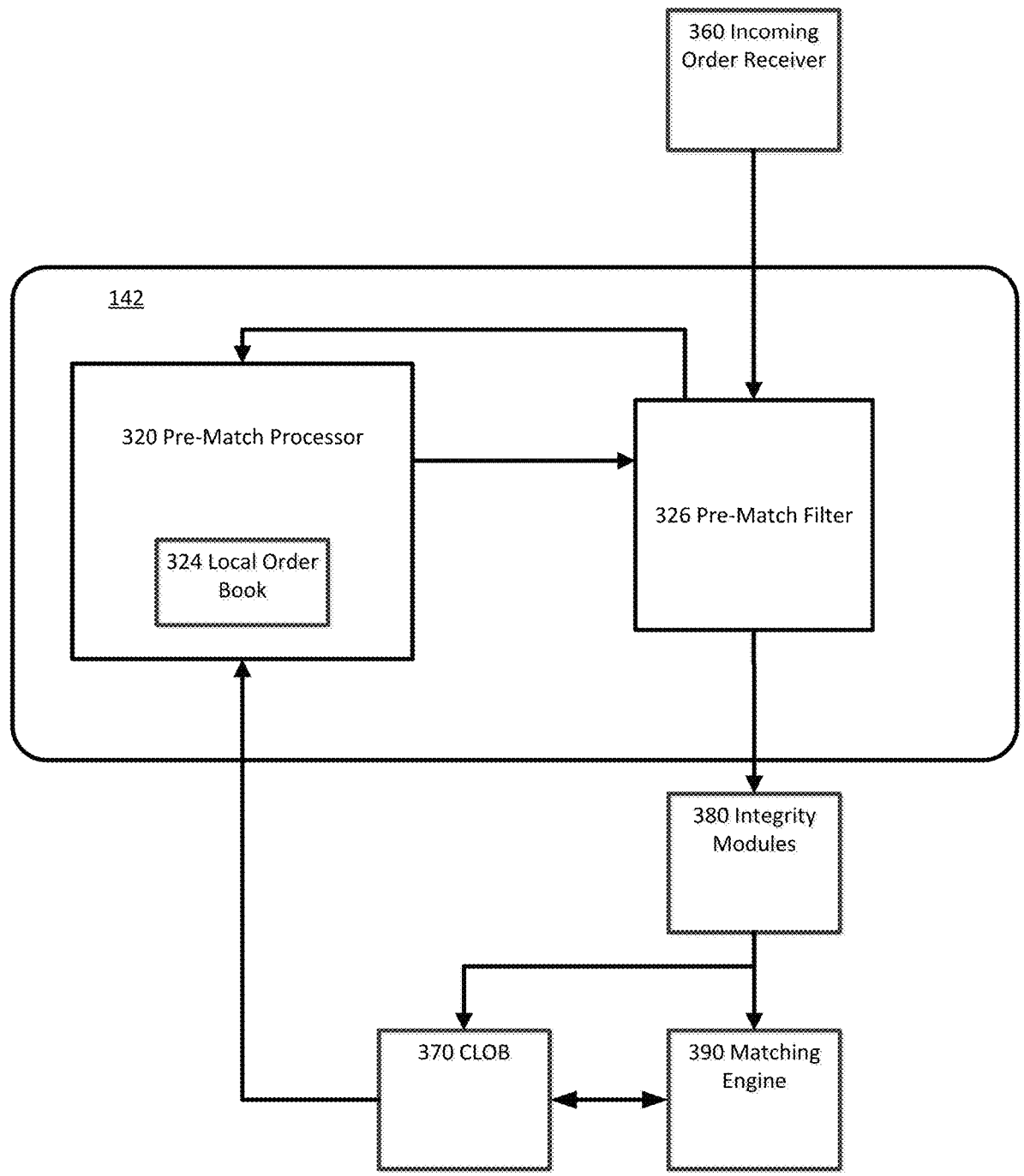
FIG. 3 depicts an illustrative example of a pre-processor of the computer network system of FIG. 1.

FIG. 3 depicts an illustrative embodiment of a pre-processor 142 shown in FIG. 1. FIG. 3 includes a data structure that stores data indicative of a local order book 324, a pre-match filter 326, and a pre-match processor 320. In an embodiment, the pre-processor 142 is configured as an field programmable gate array ("FPGA") or an application specific integrated circuit ("ASIC"). Alternatively, one or more of the local order books 324, pre-match filter, or pre-match processor 320 is configured as an FPGA or an ASIC. FIG. 3 further depicts an incoming order receiver 360, integrity modules 380, a CLOB 370, and a matching engine 390. The incoming order receiver 360 and integrity modules 380 may be implemented by the order processing module 136 of FIG. 1. The CLOB 370 may be implemented by the order book module 110 of FIG. 1. The matching engine 390 may implemented by the matching engine module 106 of FIG. 1. The incoming order receiver 360 is configured to receive orders or transactions and pass the orders or transactions to the pre-processor 142, e.g., to the pre-match filter 326. The integrity modules 380 may be configured to check incoming orders against one or more rules to maintain the integrity of the exchange system. If the integrity modules validate the incoming order, the order or transaction may be routed to the CLOB 370 or matching engine 390. The CLOB 370 may be a data structure configured to store data such as data representing an order book. The matching engine 390 may be configured to match received orders or transactions with previously received orders or transactions resting on the CLOB 370 according to a set of rules. The matching engine 390 may be implemented at least partially in software. The matching engine 390 may be implemented using a combination of hardware and software. In an embodiment, the matching engine 390 may include computer code that is configured to implement one or more matching algorithms. As implemented in software, the matching engine 390 may perform calculations slower than a hardware implementation. For example, a hardware implementation such as using a FPGA or ASIC may perform calculations quicker than a software implementation, for example written in computer code and executed on a general processing unit. A software implementation for the matching engine 390 may allow for adjustments to the algorithms. A full hardware implementation of the matching engine 390 may not be desirable due to the complexity involved. One or more portions of the pre-processor 142 may be fully implemented in hardware, e.g., FPGA or ASIC. The CLOB 370 may communicate any changes in the order book to the pre-processor 142, e.g., the pre-match processor 320 or the local order book 324.

The incoming order receiver 360 may provide an entry point for a matching engine 390 of a plurality of matching engines. For example, an exchange may include geographically distributed simultaneously running order matching engines run by a single entity, each of which forward orders to each other during real time trading. The pre-processor 142 may provide information to other pre-processors 142 that are located with other match engines. The incoming order receiver 360 and pre-processor 142 may communicate with other exchanges, for example, if required to shard orders with other exchanges.

Upon initialization or start up, such as at the beginning of a trading session, e.g., the start of a trading day, the pre-match processor 320 may be configured to identify an indicative opening price ("IOP") and generate an array of price levels that are used by the pre-match filter 326 to identify transactable orders. A price level refers to a data entry of a portion of the data structure in which data indicative of all orders at the same price are stored (or referenced in the case of indirect storage). In the local order book, the price level may only store data indicative of the aggregate quantity and whether the resting order is an offer for sale or buy orders that include the same price. For example, if a buy order is received at a price level, all the sell orders on that price level could potentially fulfill the buy order. For a simple buy or sell order, only the top price level (lowest ask or highest bid) is used to determine if a received order is transactable. For more complex orders, such as combination contracts or combination orders containing multiple component transactions, however, additional price levels may be used. For example, in a butterfly spread or a ratio spread order, the pre-match filter 326 may need to compare multiple price levels against the received order. When there are orders where the bid price is equal or higher than the lowest ask, the orders may be immediately fulfilled and will not be rested on the order book. The situation where the bid price is equal or higher than the lowest ask is referred to as crossing. For an order book, the highest bid and the lowest ask are referred as the top of the book or "inside market". A book depth refers to a number of price levels available at a particular time in the book. The book may include a fixed depth, and orders beyond that depth are not reported (or stored differently). The levels may be unlimited, but the depth communicated to market participants is limited. A participant may place a trade at any price but the market data feed from the exchange will only report, for example, the top 10 levels. Alternatively, an order book may contain and report data relating to unlimited price levels.

At the start of a trading session (or at any point thereafter), for a given product, the pre-match processor 320 may identify the IOP. The IOP may be calculated by the pre-match processor 320 or may be received from other modules that are part of the exchange system. The IOP is a probable price at which the market will open or re-open, given the current order book and order activity. The IOP may be calculated by the trading engine during the Pre-Open and Reserve states based on the orders in the respective order book. One or more rules may be used to calculate the IOP, for example, as follows: Rule 1: Determine the maximum matching quantity at a price level. Rule 2: Determine the minimum non-matching quantity. Rule 3: Determine the highest price if non-matching quantity is on the buy side for all prices. Rule 4: Determine the lowest price if non-matching quantity is on the sell side for all prices. Rule 5: Determine the closest price to the settlement price (reference price). Rules are applied in a hierarchy from Rule 1 through Rule 5. The TOP is determined by whichever rule best applies to the order book at that moment.

Based on the TOP, the pre-match processor 320 generates an array of price levels (for example, 5%, 10%, 15%, etc. above or below the TOP, expressed as individual ticks) per side (bid/ask).

The array of price levels may be stored as an array that includes a total quantity at each level. The price levels may be normalized to an index (for example representing each tick as a whole number between 0 and 200, where a median number is the IOP). Any range may be used as the index. When an incoming order arrives, a price of the incoming order is converted to an array index. At each array index, the total quantity at that price level is stored. Then, for each array index, the system checks for the highest (or lowest) index that has a non-zero value (e.g., quantity)—this is set as the best bid or best offer. In an embodiment, the array may not contain any non-zero entries.

For different products or markets, the range of the array may be set differently. Different trading strategies may be used for different products. One example are spreads. For example, a ratio spread is a strategy in options trading that involves buying a number of options and selling more options of the same underlying stock and expiration date at a different strike price. In order to identify if a transaction such as a ratio spread is transactable, the pre-match filter may need to look at additional price levels beyond the best bid or best ask. A ratio spread, for example, may require the pre-match filter to identify five different price levels. A butterfly spread may necessitate at least two price levels. Different or more complex spreads or strategies may require larger order book depths.

The array of price levels may be updated as new orders are received. A new order that is matched may remove some quantity (or a price level) from the pricing array. A new order that is not matched may add quantity (or a price level) to the pricing array. In an example, product A trades in ticks of 1, and has an IOP of 1000. 10% below 1000 is 900. 900 maps to an array index of 0, 1000 maps to array index 100, and 1100 maps to array index 200. Then, an order for 50 Product A comes in at 1002. 1002-900 will map to 102. The order quantity of 50 is added to the current resting quantity of 100, storing 150 at point 102. Then, for each array index, the system checks to see what is the highest (or lowest) index that has a non-zero value (e.g., quantity)—this will be the best bid or best offer. The best bid or best offer may be used by the pre-match filter 326 to identify incoming orders that will potentially match (and as such be routed to the matching engine 390).

During operation, the pre-match processor 320 may update the array of price levels. As resting orders are filled on the CLOB 370, the quantities and prices may be adjusted and transmitted to the local order book 324. The array of price levels may be derived from the local order book 324. Alternatively, the array of price levels may be stored in the local order book 324.

The pre-match processor 320 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the pre-match processor 320 to generate an array of price levels.

The local order book 324 stores the price levels. In an embodiment, the local order book 324 may include data that is representative of a full or partial copy of a main order book that represents and/or mirrors the CLOB 370. The CLOB 370 may store a record of some or all of the previously received transactions for a product that have not been matched. A received transaction that is not filled is stored or rested on the CLOB 370 to await future received transaction that may match with the received transaction. The CLOB 370 may thus store priced, quantity, and other data for each rested transaction. The local order book 324, however, may only store a partial copy of the CLOB 370, for example, only including data indicative of a subset of rested orders that are within the array of price levels calculated by the pre-match processor 320. The local order book 324 may only include an aggregation of quantity. For example, the array of price levels as calculated above, may only include the total quantity at each price levels, and not the individual quantities for each order. The local order book 324 may not include other data such as party information or other conditions.

In an embodiment, an order may be received that is not new, but rather modifies an existing order. An order modify may add quantity, remove quantity, or stay neutral on quantity (by changing some other value). Because the local order book 324 may not store all the data relating to each of the orders, the local order book 324 may not be able to modify an order. In this scenario, the new order may be treated as a new order and the local order book 324 may assume that all modifies are quantity adding. The modification may cause more cases where the pre-match filter 326 process reports a possible match when there is not actually a match, but pre-match filter 326 will never miss a possible match. A number of false positives may decrease performance by a small amount of the theoretical minimum but will not result in missed trades.

The local order book 324 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the local order book 324 to store values relating to price levels for a product. The local order book 324 may be implemented as content-addressable memory (CAM). The local order book 324 may store a similar or complete copy of the main order book. Alternatively, the local order book 324 may store a partial copy of the complete or main order book. In an example, the local order book 324 may store fewer price levels than the main order book. The local order book 324 may include a book depth that is related to an indicative opening price, for example, a predetermined number of price levels based on market factors such as the number of price levels per side, historical data, and other market factors.

The pre-match filter 326 may be configured to flag an incoming order when incoming order is transactable (e.g., crosses the local order book 324). The local order book 324 is crossed if the received order and the best offer cross.

When the flag is set, the pre-processor 142 passes the incoming order to the CLOB 370 for matching. If the flag is set, the pre-match processor 320 will pause processing new orders and any further operations on the local order book 324 until the pre-processor 142 receives a response from the CLOB 370. If the flag is not set, the pre-processor 142 will pass the order to the CLOB 370 while continuing operations with incoming orders. When the pre-processor 142 identifies a transactable order and passes it to the CLOB 370, the CLOB 370 provides the pre-processor 142 with the state of affected price levels after it completes the match process.

The pre-match filter 326 flags the incoming order as transactable, and hands the incoming order over to the full booking engine for matching. If the flag is set, the pre-processor 142 pauses any further operations on the book until the pre-processor 142 receives a response from the main booking engine. If the flag is not set, it will forward the order to the CLOB 370 and continue operations with incoming orders.

In an embodiment, the pre-match filter 326 compares the incoming order against the array of price levels. The pre-match filter 326 determines if there is any quantity at the price level specified in the incoming order. If so, the pre-match filter 326 may flag the incoming order as transactable. If not, the pre-match filter 326 may not flag the incoming order. In an embodiment, the pre-match filter 326 may also compare the quantity request in the incoming order to a quantity store in the array of price levels. Additional conditions may be included in an incoming order. In an embodiment, the pre-match filter 326 may test one or more of these conditions with the array or price levels or data in the local order book 324. The pre-match filter 326 may be configured so that the pre-match filter 326 does not miss any potentially transactable orders. The pre-match filter 326 may flag orders as transactable that are eventually not matched by the matching engine 390 (e.g., false positives). Even, however, with some false positives slipping through, the pre-match filter 326 and system may still provide an increase in throughput and a decrease in computational resources required.

In an embodiment, the pre-match filter 326 only checks incoming order's price against the top of the local order book 324. For example, if the top of the local order book 324 lists at least one quantity offered at 102, any incoming order regardless of the quantity would be flagged if the incoming order includes a price of 102 or greater. Whether or not the incoming order fully or partially matches is not determined by the pre-match filter 326. Nor does the pre-match filter 326 identify which resting orders the incoming order will potentially match with.

The pre-match filter 326 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the pre-match filter 326 to identify and flag incoming orders that are transactable.

When the pre-processor 142 has identified a transactable order, flagged the order, and forwarded the order to the verification modules and full matching engine 390, the pre-processor 142 may pause and await an updated state of affected price levels. The full matching engine 390 matches (at least partially) the order with a previously received order and updates the CLOB 370. The matching engine 390 may then provide the pre-processor 142 with the state of affected price levels after the match. Additionally, after the processing of a modify or cancel, the matching engine will provide the revised quantities for the affected price levels.

The pre-processor 142 may be connected to systems or machines outside the exchange system. The pre-processor 142 may communicate with the order book module 110, the matching engine module 106, the order processing module 136, such as via wide area network 126 and/or local area network 124 and computer devices 114, 116, 118, 120 and 122.

Figure 4:
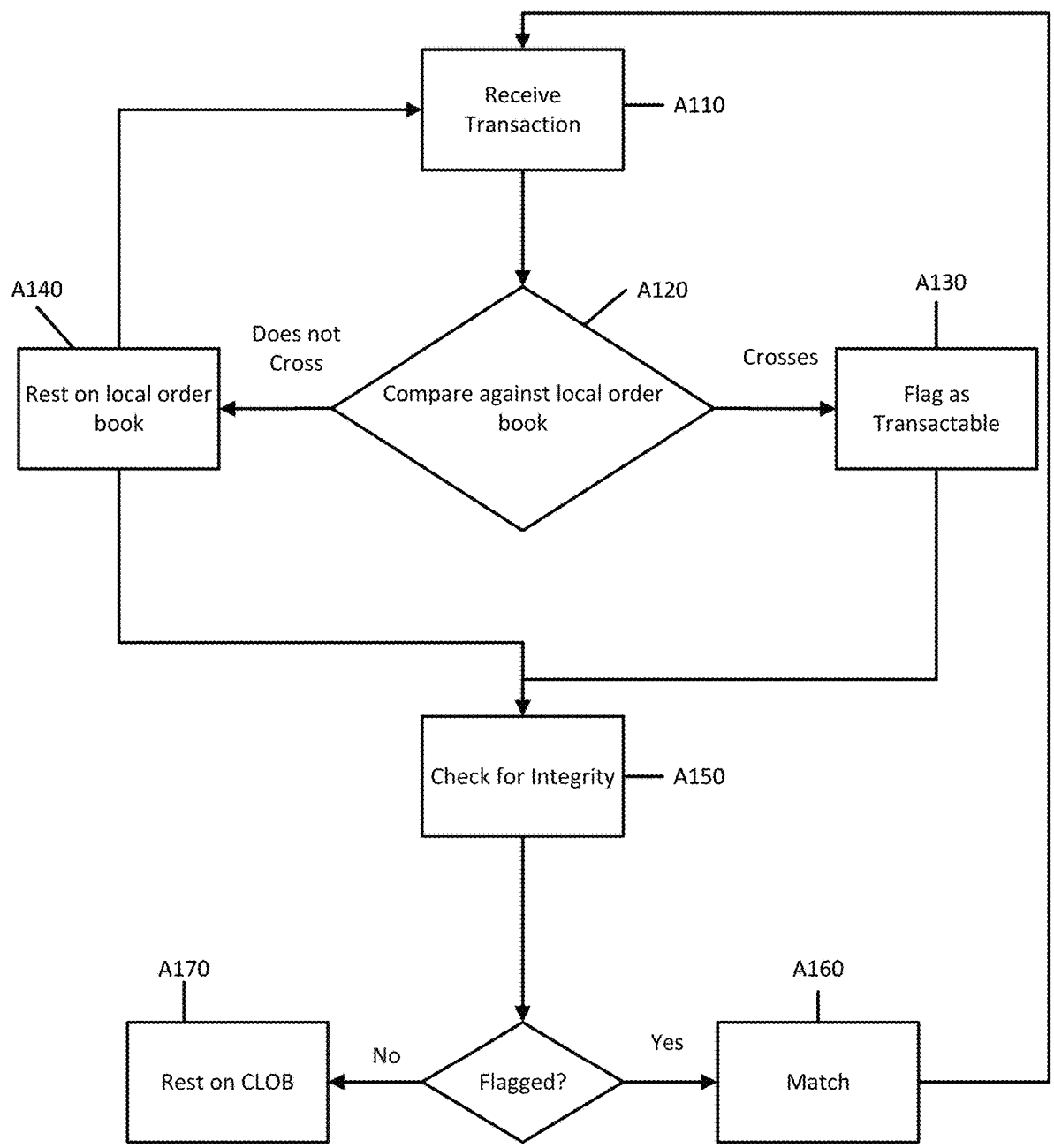
FIG. 4 depicts an example flowchart indicating a method of implementing the disclosed system for pre-matching orders at the wire rate.

FIG. 4 depicts an example workflow of the operation of the pre-processor 142 of FIG. 3. The workflow in FIG. 4 may be used to receive a transaction, compare the transaction against a stored value, and make a routing decision based on the comparison. FIG. 4 depicts a computer implemented method for pre-booking orders at the wire rate in a data transaction processing system in which data items are transacted by a matching processor that matches electronic data transaction request messages for the same one of the data items.

At act A110, a transaction is received. The transaction may be from, and therefore associated with, a market participant of an electronic market managed by an electronic trading system. The transaction may involve an order as extracted from a received message and may have an associated action. The actions may involve placing an order to buy or sell a financial product in the electronic market or modifying or deleting such an order. In an embodiment, the financial product may be based on an associated financial instrument which the electronic market is established to trade. The transaction may be referred to as the received transaction, an electronic data message, an electronic data transaction request message, a received order, an order, or just the transaction.

At act A120, the received transaction is compared against one or more values stored in a local order book 324. The transaction may include a price, a quantity, and a desired action. The price may be compared against a pricing array that includes one or more price levels indicative of resting orders on a main order book. A pricing array, for example, may indicate the quantity available at various pricing levels.

In an embodiment, the entire main order book may be represented in the local order book 324 by the pricing array. Alternatively, the pricing array may only include a partial set of the pricing levels, for example, the pricing levels within 10% of the TOP. In an embodiment, the pricing array does not include a total quantity, but rather just a listing of available pricing levels. The number of pricing levels may be set on a basis of the amount of total quantity within a range of the TOP, A maximum expected quantity of an order may be used to identify the depth of the pricing, levels.

The received transaction may be compared against a pricing level that represents the Lop of the book. The comparison may determine if the transaction could potentially, transact. An incoming transaction could potentially transact when the incoming transaction crosses the local book (or a price level in the array of price levels). Crossing the book refers to when an incoming order includes a price that would potentially match a resting order. In an example, there is a resting order to sell 50 units of product A in the order book at 103. If an incoming order is a buy order with a price at or above 103, the orders would match (and the order book would be temporarily crossed until the match was finalized). If the incoming order was for less than 103 and there were no resting orders to sell at less than 103, then the incoming order would not match, the order book would not be crossed, and the incoming order would be placed in the order book to await a future incoming order.

At act A130, when the received transaction crosses the value stored in the local order book 324, the transaction is flagged. When a transaction is flagged, the pre-processor 142 may be paused until the transaction is matched by the matching engine 390. Pausing the pre-processor 142 stops incoming orders from being pre-booked. The pre-processor 142 unlocks after receiving a message from the CLOB 370 reporting the results of the match (or non-match in certain scenarios). The message from the CLOB 370 provides an update for the local order book 324 and thus allows the pre-processor 142 to accurately predict if a future received transaction will cross.

At act A140, if the received transaction does not cross the local order book 324, the transaction is rested on the local order book 324. The local order book 324, as described above, may be a partial copy of the full book. The price array may be based off of or stored as the local order book 324. When the pre-book receives a subsequent order, the pre-book and price array is as such already updated in order to not miss a potential match. There are two mechanism that provide updates. Transactions that are not predicted to match are stored in the pre-book. Transactions that do match are routed through verification stages and the matching engine 390. As describe above, the resulting match and update of the full book is transmitted back to the pre-book to update the local order book 324 with the new status of the CLOB 370.

If the transaction does not cross the local order book 324, the pre-processor 142 may transmit a command to begin a reporting process. The received transaction may continue to be processed by, for example, the integrity modules and the CLOB 370. The reporting process may include transmitting a reporting message indicating that the transaction did not match and will be rested on the CLOB 370.

At act A150, the transaction is passed through one or more modules that verify the transaction for market integrity. The transaction integrity modules evaluate the transaction to determine whether values for the transaction pass one or more market protecting integrity rules. The transaction integrity modules may scan for, rapidly detect, and respond to extreme changes, either up ("spike") or down ("dip") in the market where a precipitous market move/change occurs. If an unacceptable transaction is detected, the transaction integrity modules may respond by taking an action, e.g., a corrective or responsive action, such as notifying the operator of the exchange, such as the Global Control Center ("GCC") of the Chicago Mercantile Exchange ("CME"), placing the market in a paused or reserved state, establishing permanent or temporary trade price limitations, or other actions, or combinations thereof, to mitigate the effects of the extreme change, so as to, for example, slow down the market or otherwise allow traders time to adequately analyze and react to market conditions, and subsequently submitting more messages/orders that can be used to better determine a true consensus. The transaction integrity modules may be implemented to automatically perform a corrective action, e.g., halt or release the matching processor depending on the state of the system and/or the contents of the electronic data transaction request messages. For example, upon detecting an undesirable condition within the data transaction processing system, transaction integrity modules may cause halting of the matching processor, which prevents the matching processor from matching messages, e.g., places the system or data objects related to the undesirable condition in a reserved state. After the passage of time, receipt of a number of messages, or some other predetermined condition, transaction integrity modules may release the matching processor, or allow the matching processor to resume matching messages.

Transaction integrity module processing is time consuming and increases latency, in part because it compares each transaction request value to predetermined and/or dynamic thresholds. When a transaction is flagged as crossing one or more values stored in the local order book 324, the pre-processor 142 and thus intake of transactions may be paused until the pre-processor 142 receives a response from the CLOB 370. The response from the CLOB 370 may not be transmitted and received until after the transaction integrity modules have performed their integrity checks and the matching engine 390 has attempted to match the transaction. In, for example, systems that pause until each and every transaction has passed through the integrity modules and matching engine 390, the latency may be large. In an embodiment, the latency is diminished, as the pre-processor 142 does not pause for transactions that are not flagged as potentially matching allowing the system to continue to receive transaction even while one or more transactions move through the integrity modules. The ability to process multiple transactions through pipelines instead of sequentially saves valuable processing time. A transaction message that is not expected to match may be processed by one or more the integrity modules while another transaction message is being rested on the CLOB 370, while another is undergoing pre-booking by the pre-processor 142. The ability to perform each of these processing tasks simultaneously allows for additional transaction messages to be received and processing, allowing the exchange system to process transaction messages at the wire rate.

At act A160, if the transaction is flagged, the transaction is passed to the matching engine for matching. The matching engine attempts to match the transaction using a matching algorithm. If the matching engine identifies one or more suitable previously received but unsatisfied counter orders, they, and the transaction, are matched to execute a trade there between to at least partially satisfy the quantities of one or both the transaction or the identified orders. If there remains any residual unsatisfied quantity of the identified one or more orders, those orders are left on the order book with their remaining quantity to await a subsequent suitable counter order, i.e., to rest.

If the matching engine does not identify a suitable previously received but unsatisfied counter order, or the one or more identified suitable previously received but unsatisfied counter orders are for a lesser quantity than the first order, the transaction is placed on the order book, referred to as "resting", with original or remaining unsatisfied quantity, to await a subsequently received suitable order counter thereto. The matching engine then generates match event data reflecting the result of this matching process.

At act A170, if the transaction is not flagged, the transaction is routed to and rested on the CLOB 370. Outstanding (unmatched, wholly unsatisfied/unfilled, or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. Separate order book may be maintained for each product, e.g., instrument, traded on the electronic trading system. Each order book may generally define or otherwise represent the state of the market for that product, i.e., the current prices at which the market participants are willing buy or sell that product. As such, as used herein, an order book for a product may also be referred to as a market for that product. In particular, a CLOB 370 is an order book made up of limit orders what is processed continuously as time moves forward.

When the order book is updated either by a match occurring or an order being rested, the update may be transmitted to the pre-book in order to update the pre-book as well. In an embodiment, the pre-book constantly monitors the order book for any changes. Any changes to the particular CLOB 370 may be automatically copied to the pre-book. Depending on the complexity of the pre-book, the entirely of the change may be transmitted to the pre-book. Alternatively, only information that may affect the pricing levels or array may be transmitted. An order that rests on the order book outside of the depth of the pre-book may not be transmitted as the order would not result in a change to the pre-book. In an embodiment, the pre-book only monitors the top of the CLOB 370 for changes. Changes that occur below the top of the book may be ignored as the changes do not affect the flagging mechanism of the pre-processor 142.

Figure 5:
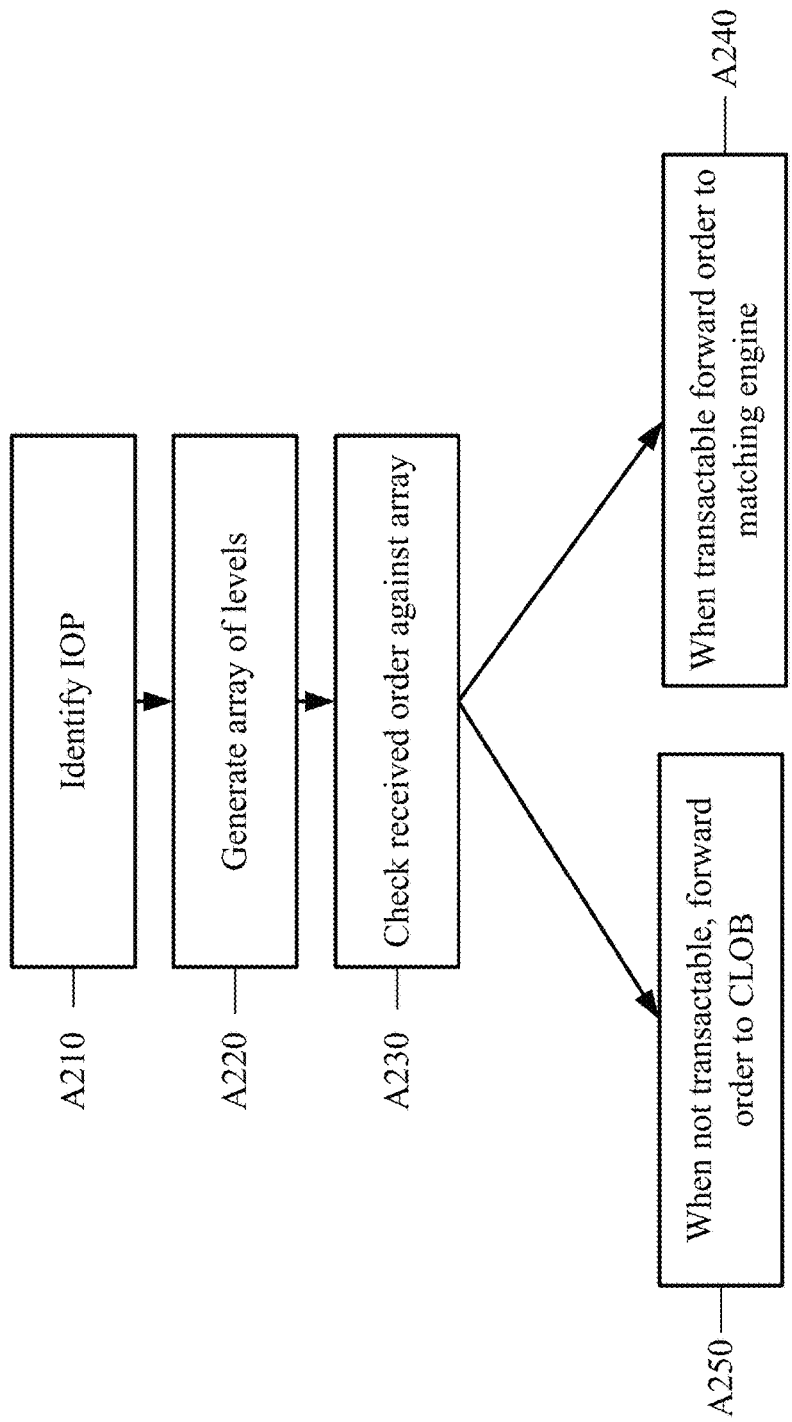
FIG. 5 depicts an example flowchart indicating a method of implementing the disclosed system for pre-matching orders at the wire rate.

FIG. 5 depicts a workflow for pre-matching order at wire rate as may be implemented with computer devices and computer networks, such as those described with respect to FIG. 1, 2, or 3. Embodiments may involve all, more or fewer actions indicated by the blocks of FIG. 5. The actions may be performed in the order or sequence shown or in a different sequence.

At act A210, an TOP is identified. The TOP may be calculated by the pre-processor 142 or may be received from other modules that are part of the exchange system. The TOP is a probable price at which the market will open or re-open, given the current book and order activity. The TOP may be calculated by the trading engine during the pre-open and reserve states based on the orders in the respective order book. One or more rules may be used to calculate the TOP, for example, as follows: Rule 1: Determine the maximum matching quantity at a price level. Rule 2: Determine the minimum non-matching quantity. Rule 3: Determine the highest price if non-matching quantity is on the buy side for all prices. Rule 4: Determine the lowest price if non-matching quantity is on the sell side for all prices. Rule Determine the closest price to the settlement price (reference price). Rules are applied in a hierarchy from Rule 1 through Rule 5. The TOP is determined by whichever rule best applies to the order book at that moment.

At act A220, an array of price levels is generated. Based on the TOP, the pre-processor 142 generates an array of price levels (for example, 5%, 10%, 15%, etc. above or below the TOP, expressed as individual ticks) per side (bid/ask). For all incoming orders, the price is converted to an array index. At each array index, the total quantity at that price level is stored. Then, for each array index, the system checks for the highest (or lowest) index that has a non-zero value (e.g., quantity)—this is set as the best bid or best offer. For different products or markets, the range of the array may be set differently. For example, a market with large quantities of orders may include additional price levels so as to make sure that any incoming order will not fill all orders in the price levels in the array.

The array of price levels may be updated as new orders are received and are either matched or rested. For example, if the array of price levels is initially set at 10% of the IOP, any subsequent change in the price in either direction may prompt price levels to be added or removed. For example, if an incoming order clears out two offer price levels, the array of prices may be updated to include two additional price levels at the bottom of the book.

At act A230, a received order is compared with the array of price levels to determine if the received order is transactable. The array of price levels or local order book 324 include a best offer and/or a best bid. A best offer is the lowest price level in the array levels. The best bid is the highest price level in the array levels. If the received order includes instructions to sell and includes a price that is below the best bid, then the order (and book) will cross. If the received order includes instructions to buy and includes a price that is above the best offer, then the order (and book) will cross.

In an embodiment, the quantity of the received order may be disregarded. The only determination that may be made is whether or not there is a cross, not, for example, the magnitude or quantity or parties that may potentially match. Alternatively, the quantity of the received order may also be compared to a quantity in the array of price levels.

At act A240 if the received order is determined to be transactable, the received order is transmitted to the matching engine 390. If the received order is determined to be transactable, the system pauses processing new order and any further operations on the local book until the pre-processor 142 receives a response from the CLOB 370.

The received order may also undergo one or more steps to check the order for market integrity. To mitigate risk and ensure a fair and balanced market, electronic trading systems provide mechanisms to rapidly detect and respond to situations where a market is not operating in a fair and balanced manner or otherwise where the market value is not reflective of a true consensus of the value of the traded products among the market participants. Transaction integrity modules evaluate message values to determine whether newly received messages should be subject to market protecting integrity modules. Transaction integrity module processing is time consuming and increases latency, in part because it compares each transaction request value to predetermined and/or dynamic thresholds. Additionally, the integrity modules may operate on messages serially. Each message may go through all of the filters and the matching engine 390 before a new message enters the queue.

At act A250 if the received order is determined to not be transactable, the received order is not transmitted to the matching engine 390. Non-transactable received orders are stored in the local order book 324. The local order book 324 may update the array of price levels or may be used directly in the determination of transactability. Information from the non-transactable received orders may also be directly used to update the array of price levels. The received order is routed to the CLOB 370 for storage and to await a future order that may match. During the routing of the received order to the CLOB 370, the pre-processor 142 may process other incoming orders.

When applied to a financial exchange computer system, the embodiments described herein may utilize trade related electronic messages to enact trading activity in an electronic market. The trading entity and/or participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product.

In one embodiment, the orders are for options contracts that belong to a common option class. Orders may also be for baskets, quadrants, other combinations of financial instruments, etc. The option contracts may have a plurality of strike prices and/or comprise put and call contracts. As used herein, an exchange 100 includes a place or system that receives and/or executes orders.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of ordinary skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for optimizing processing of electronic data transaction request messages, the method comprising:
   receiving, by a pre-processor coupled with a local data structure, a first electronic data transaction request message;
   determining, by the pre-processor, that the first electronic data transaction request message is not transactable based on a comparison with one or more levels stored in the local data structure;
   updating, by the pre-processor, the one or more levels stored in the local data structure with one or more values from the first electronic data transaction request message;
   storing, by the pre-processor, the first electronic data transaction request message in a central limit order book data structure separate from the local data structure;
   receiving, by the pre-processor, a second electronic data transaction request message;
   determining, by the pre-processor, that the second electronic data transaction request message is transactable based on a comparison with the updated one or more levels stored in the local data structure; and
   matching, by a matching processor coupled with the pre-processor and separate from the pre-processor, at least partially, the second electronic data transaction request message with at least one other previously received but unsatisfied electronic data transaction request message counter thereto stored in the central limit order book data structure.

2. The method of claim 1, further comprising:
   receiving, by the pre-processor, a result of the match by the matching processor; and
   updating, by the pre-processor, the one or more levels with one or more values from the match.

3. The method of claim 1, further comprising:
   locking the pre-processor after determining that the second electronic data transaction request message is transactable; and
   unlocking the pre-processor after updating the local data structure with the one or more values from the match.

4. The method of claim 1, wherein a quantity of the one or more levels in the local data structure is calculated based on an indicative opening price.

5. The method of claim 4, wherein each of the one or more levels includes a portion of the local data structure in which data indicative of all electronic data transaction request messages at a same price are stored.

6. The method of claim 1, further comprising:
verifying, by one or more integrity modules coupled between the pre-processor and the matching processor, that the first and the second electronic data transaction request messages passes one or more rules.

7. The method of claim 1, further comprising:
determining, by the pre-processor, whether the first and the second electronic data transaction request messages are transactable by comparing each of the first and second electronic data transaction request messages to previously stored electronic data transaction request messages stored in the local data structure.

8. The method of claim 1, further comprising:
storing, by the pre-processor, a copy of the first electronic data transaction request message in the local data structure.

9. The method of claim 1, further comprising:
forwarding, by the pre-processor, the second electronic data transaction request message to the matching processor;
forwarding, by the pre-processor, the first electronic data transaction request message to the central limit order book data structure for storage therein; and
not forwarding, by the pre-processor, the first electronic data transaction request message to the matching processor.

10. A system for optimizing processing of electronic data transaction request messages, the system comprising:
a pre-processor coupled with a local data structure, the pre-processor configured to:
receive a first electronic data transaction request message;
determine that the first electronic data transaction request message is not transactable based on a comparison with one or more levels stored in the local data structure;
update the one or more levels stored in the local data structure with one or more values from the first electronic data transaction request message;
store the first electronic data transaction request message in a central limit order book data structure separate from the local data structure;
receive a second electronic data transaction request message; and
determine that the second electronic data transaction request message is transactable based on a comparison with the updated one or more levels stored in the local data structure; and
a matching processor coupled with the pre-processor and separate from the pre-processor, the matching processor configured to match, at least partially, the second electronic data transaction request message with at least one other previously received but unsatisfied electronic data transaction request message counter thereto stored in the central limit order book data structure.

11. The system of claim 10, wherein the pre-processor is further configured to:
receive a result of the match by the matching processor; and
update the one or more levels with one or more values from the match.

12. The system of claim 10, wherein the pre-processor is further configured to:
be locked after determining that the second electronic data transaction request message is transactable; and
be unlocked after the update of the local data structure with the one or more values from the match.

13. The system of claim 10, wherein a quantity of the one or more levels in the local data structure is calculated based on an indicative opening price.

14. The system of claim 13, wherein each of the one or more levels includes a portion of the local data structure in which data indicative of all electronic data transaction request messages at a same price are stored.

15. The system of claim 10, further comprising:
one or more integrity modules coupled between the pre-processor and the matching processor and configured to verify that the first and the second electronic data transaction request messages pass one or more rules.

16. The system of claim 10, wherein the pre-processor is further configured to:
determine whether the first and the second electronic data transaction request messages are transactable by comparing each of the first and second electronic data transaction request messages to previously stored electronic data transaction request messages stored in the local data structure.

17. The system of claim 10, wherein the pre-processor is further configured to:
store a copy of the first electronic data transaction request message in the local data structure.

18. The system of claim 10, wherein the pre-processor is further configured to:
forward the second electronic data transaction request message to the matching processor;
forward the first electronic data transaction request message to the central limit order book data structure for storage therein; and
not forward the first electronic data transaction request message to the matching processor.

19. The system of claim 10, wherein the pre-processor is configured as a FPGA.

20. A system for optimizing processing of electronic data transaction request messages, the system comprising:
means for receiving a first electronic data transaction request message;
means for determining that the first electronic data transaction request message is not transactable based on a comparison with one or more levels stored in a local data structure;
means for updating the one or more levels stored in the local data structure with one or more values from the first electronic data transaction request message;
means for storing the first electronic data transaction request message in a central limit order book data structure separate from the local data structure;
means for receiving a second electronic data transaction request message;
means for determining that the second electronic data transaction request message is transactable based on a comparison with the updated one or more levels stored in the local data structure; and
means for matching at least partially, the second electronic data transaction request message with at least one other previously received but unsatisfied electronic data transaction request message counter thereto stored in the central limit order book data structure.

* * * * *